US010862670B2

(12) United States Patent
Zeh et al.

(10) Patent No.: US 10,862,670 B2
(45) Date of Patent: Dec. 8, 2020

(54) AUTOMOTIVE NONCE-MISUSE-RESISTANT AUTHENTICATED ENCRYPTION

(71) Applicant: Infineon Technologies AG, Neubiberg (DE)

(72) Inventors: Alexander Zeh, Munich (DE); Patrick Kresmer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 188 days.

(21) Appl. No.: 15/983,594

(22) Filed: May 18, 2018

(65) Prior Publication Data

US 2019/0356468 A1 Nov. 21, 2019

(51) Int. Cl.
*H04L 9/06* (2006.01)
*H04L 9/08* (2006.01)

(52) U.S. Cl.
CPC .......... *H04L 9/0631* (2013.01); *H04L 9/0637* (2013.01); *H04L 9/0861* (2013.01); *H04L 2209/125* (2013.01); *H04L 2209/46* (2013.01)

(58) Field of Classification Search
CPC ... H04L 9/0631; H04L 9/0637; H04L 9/0861; H04L 2209/125; H04L 2209/46
See application file for complete search history.

(56) References Cited

U.S. PATENT DOCUMENTS

| 2002/0191790 A1* | 12/2002 | Anand | G06F 21/72 |
| | | | 380/255 |
| 2015/0033016 A1* | 1/2015 | Thornton | H04L 9/0825 |
| | | | 713/171 |
| 2016/0342531 A1* | 11/2016 | Sharma | G06F 12/1408 |
| 2017/0111330 A1* | 4/2017 | Mosko | H04L 9/3242 |
| 2017/0357820 A1* | 12/2017 | Sierra | G06F 21/6245 |
| 2017/0366340 A1* | 12/2017 | Wyseur | H04L 9/3242 |
| 2018/0294968 A1* | 10/2018 | Johnson | H04L 9/3239 |

OTHER PUBLICATIONS

National Institute of Standards and Technology (NIST), "Advanced Encryption Standard (AES)." FIPS 197, Nov. 16, 2001, 51 pages.
M. J. Dworkin, "SP 800-38B. Recommendation for Block Cipher Modes of Operation: The CMAC Mode for Authentication," National Institute of Standards & Technology, Gaithersburg, MD, United States, 2005, 25 pages.

(Continued)

*Primary Examiner* — Ali S Abyaneh
*Assistant Examiner* — Zoha Piyadehghibi Tafaghodi
(74) *Attorney, Agent, or Firm* — Harrity & Harrity, LLP

(57) ABSTRACT

A system may include a plurality of matching block cipher devices, and a hardware state machine communicatively coupled to each of the plurality of matching block cipher devices. Each of the plurality of matching block cipher devices can be independently invoked by the hardware state machine such that the hardware state machine causes two or more of the plurality of matching block cipher devices to selectively perform a block-cipher-based symmetric cryptographic operation in a redundant mode or a parallel mode. The block-cipher-based symmetric cryptographic operation may be associated with securing a communication channel of an automotive system.

20 Claims, 10 Drawing Sheets

(56) References Cited

OTHER PUBLICATIONS

M. J. Dworkin, "SP 800-38C. Recommendation for Block Cipher Modes of Operation: The CCM Mode for Authentication and Confidentiality," National Institute of Standards & Technology, Gaithersburg, MD, United States, 2004, 27 pages.

M. J. Dworkin, "SP 800-38D. Recommendation for Block Cipher Modes of Operation: Galois/Counter Mode (GCM) and GMAC," National Institute of Standards & Technology, Gaithersburg, MD, United States, 2007, 39 pages.

Bock et al., "Nonce-Disrespecting Adversaries: Practical Forgery Attacks on GCM in TLS", May 17, 2016, 16 pages.

AUTOSAR: Automotive open system architecture: http://www.autosar.org/., Dec. 20, 2017, 7 pages.

S. Gueron, A. Langley, and Y. Lindell, "AES-GCM-SIV: Specification and Analysis," Jul. 22, 2017, 16 pages.

Y. Lindell, A. Langley, and S. Gueron, "AES-GCM-SIV: Nonce Misuse-Resistant Authenticated Encryption." [Online]. Available: https://tools.ietf.org/html/draft-irtf-cfrg-gcmsiv-05, May 21, 2017, 56 pages.

S. Gueron and Y. Lindell, "GCM-SIV: Full Nonce Misuse-Resistant Authenticated Encryption at Under One Cycle Per Byte," Mar. 10, 2016, 21 pages.

M. Vanhoef and F. Piessens, "Key Reinstallation Attacks: Forcing Nonce Reuse in WPA2," in Proceedings of the 2017 ACM SIGSAC Conference on Computer and Communications Security, New York, NY, USA, 2017, 16 pages.

"IEEE 802.1: 802.1AE—Media Access Control (MAC) Security." [Online]. Available: http://www.ieee802.org/1/pages/802.1ae.html. Aug. 18, 2006, 154 pages.

S. Bellovin, "Guidelines for Specifying the Use of IPsec Version 2." [Online]. Available: https://tools.ietf.org/html/rfc5406., Feb. 2009, 26 pages.

T. Dierks and E. Rescorla, "The Transport Layer Security (TLS) Protocol Version 1.2 IETF RFC5246." [Online]. Available: https://tools.ietf.org/html/rfc5246., Aug. 2008, 208 pages.

A. M. Dworkin (NIST), "SP 800-38A, Recommendation for Block Cipher Modes of Operation: Methods and Techniques." [Online]. Available: https://csrc.nist.gov/publications/detail/sp/800-38a/final., Dec. 2001, 66 pages.

A. Joux, "Authentication failures in NIST version of GCM," Jan. 2006, 9 pages.

P. Rogaway and T. Shrimpton, "A Provable-Security Treatment of the Key-Wrap Problem," in Advances in Cryptology—EUROCRYPT 2006, 2006, 18 pages.

V. T. Hoang, T. Krovetz, and P. Rogaway, "Robust Authenticated-Encryption AEZ and the Problem That It Solves," in Advances in Cryptology—EUROCRYPT 2015, Mar. 31, 2017, 36 pages.

S. Gueron, "Intel® Advanced Encryption Standard (Intel® AES) Instructions Set—Rev 3.01 | Intel® Software." https://www.intel.com/content/dam/doc/white-paper/advanced-encryption-standard-new-instructions-set-paper.pdf, 94 pages.

* cited by examiner

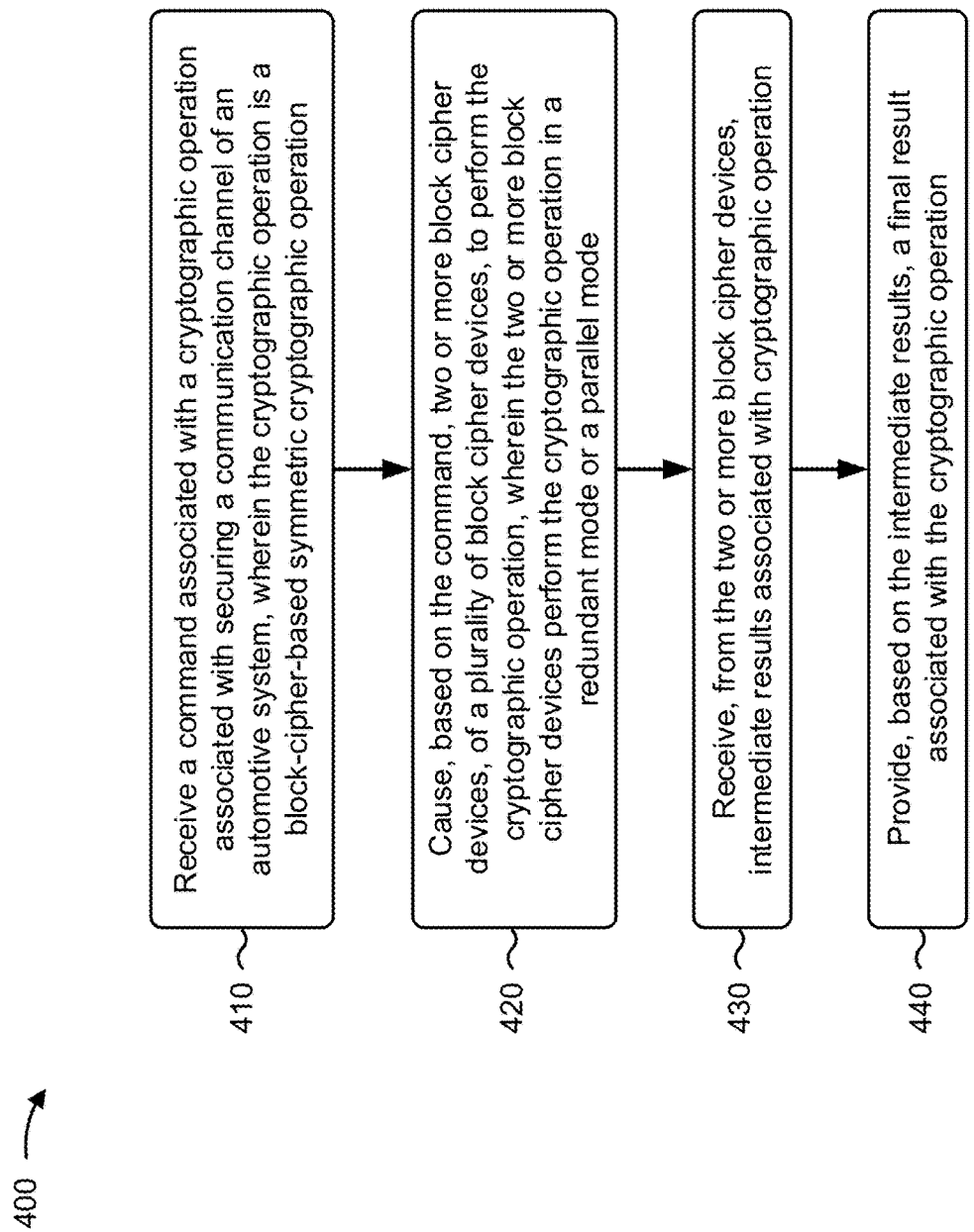

AUTOMOTIVE NONCE-MISUSE-RESISTANT AUTHENTICATED ENCRYPTION

BACKGROUND

An Authenticated Encryption with Additional Data (AEAD) scheme aims to provide confidentiality, authenticity, and integrity for a message consisting of plaintext data and additional (e.g., header) data. An AEAD scheme may be used in, for example, an automotive semiconductor application, where functional safety, real-time constraints, reusability, cost, flexibility, strong/robust security, and energy consumption may play an important role. For example, Ethernet-based in-vehicle communications are increasingly reliant on ISO-OSI Layer 2-5 protocols (e.g., Media Access Control Security (MACsec), Internet Protocol Security (IPsec), Datagram Transport Layer Security (DTLS), and/or the like), which specify Advanced Encryption Standard (AES) in Galois Counter Mode (GCM) (i.e., AES-GCM) and AES Counter Mode (i.e., AES-CTR) with Cipher Block Chaining Message Authentication Code (CBC-MAC) (i.e., AES-CCM) as a potential AEAD cipher suite. As an additional example, AES Cipher-Based Message Authentication Code (i.e., AES-CMAC) is an AES-based authentication-only mode standardized by AUTOSAR for secure onboard communication.

SUMMARY

According to some possible implementations, a system may include: a plurality of matching block cipher devices; and a hardware state machine communicatively coupled to each of the plurality of matching block cipher devices, wherein each of the plurality of matching block cipher devices can be independently invoked by the hardware state machine such that the hardware state machine causes two or more of the plurality of matching block cipher devices to selectively perform a block-cipher-based symmetric cryptographic operation in a redundant mode or a parallel mode, wherein the block-cipher-based symmetric cryptographic operation is associated with securing a communication channel of an automotive system.

According to some possible implementations, a method may include: receiving, by a hardware state machine, a command associated with a block-cipher-based symmetric cryptographic operation, wherein the block-cipher-based symmetric cryptographic operation is associated with securing a communication channel of an automotive system; causing, by the hardware state machine and based on the command, one or more block cipher devices to perform the block-cipher-based symmetric cryptographic operation, wherein the one or more block cipher devices are included in a plurality of matching block cipher devices communicatively coupled to the hardware state machine, wherein the one or more block cipher devices form a pseudo random function (PRF) and act as a counter (CTR) mode, wherein the pseudo random function (PRF) is based on cipher block chaining (CBC) and uses a first secret key and a second secret key, and wherein the counter (CTR) mode uses a third secret key; receiving, by the hardware state machine and from the one or more block cipher devices, one or more intermediate results associated with the block-cipher-based symmetric cryptographic operation; and providing, by the hardware state machine, a final result associated with the block-cipher-based symmetric cryptographic operation.

According to some possible implementations, a system may include: a plurality of block cipher devices, wherein each of the plurality of block cipher devices is associated with the same cryptographic primitive; and a state machine, at least partially implemented in hardware and communicatively coupled to each of the plurality of block cipher devices, to: receive a command associated with a cryptographic operation associated with securing a communication channel of an automotive system, wherein the cryptographic operation is a block-cipher-based symmetric cryptographic operation, cause, based on the command, two or more block cipher devices, of the plurality of block cipher devices, to perform the cryptographic operation, wherein each of the one or more block cipher devices performs the cryptographic operation in a redundant mode or a parallel mode, receive, from the one or more block cipher devices, an intermediate result associated with the cryptographic operation, and provide, based on the intermediate result, a final result associated with the cryptographic operation.

BRIEF DESCRIPTION OF THE DRAWINGS

FIG. 4 is a flow chart of an example process associated with the example shown in FIGS. 3A and 3B.

DETAILED DESCRIPTION

Figure 1:
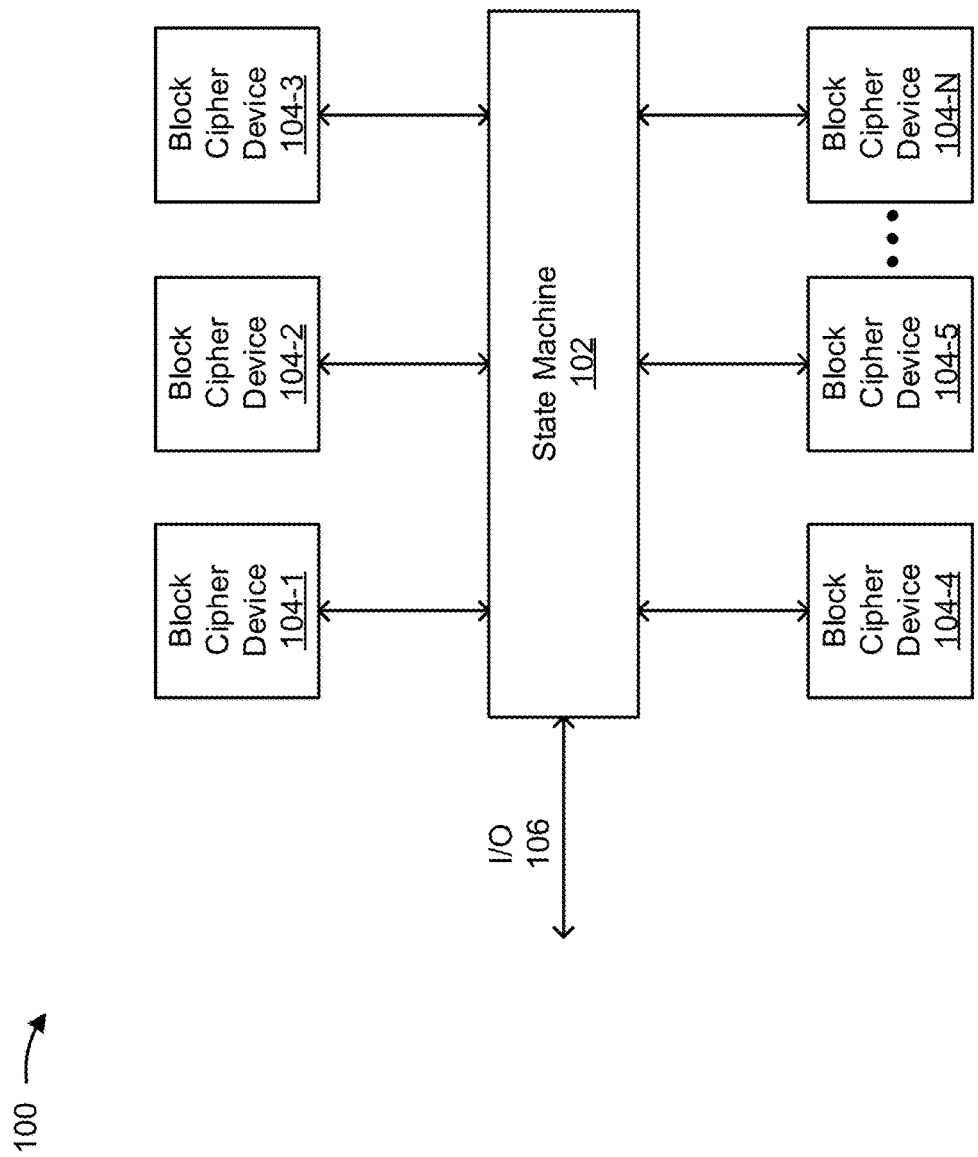
FIG. 1 is a diagram of an example system described herein.

The following detailed description of example implementations refers to the accompanying drawings. The same reference numbers in different drawings may identify the same or similar elements.

As described above, an AEAD scheme may be designed to ensure confidentiality, authenticity, and data integrity for a message consisting of plaintext data and (optional) additional data. An AEAD scheme may provide an encrypted message that consists of a ciphertext and a Message Authentication Code (MAC) (sometimes referred to as a tag). While, the additional data is not encrypted, the additional data is protected by the tag (i.e., only authenticity and integrity are provided for the additional data).

An AEAD scheme requires a secret encryption key and a nonce. The nonce is used as a randomizer such that a given ciphertext and tag pair appears to be chosen at random, even if the same message is encrypted twice. The nonce need not be secret or unpredictable, but should be unique for every message that is processed during the lifetime of the secret encryption key in order to provide confidentiality, authenticity, and integrity.

However, in practice, ensuring uniqueness of the nonce may be difficult. For example, preventing a recurring nonce (for a given symmetric encryption key) may be difficult in an automotive system since the automotive system may include a rather complex communications network. In particular, an automotive system may involve tens or hundreds of microcontrollers, various bus systems, different protocols, and/or many communication interfaces. Additionally, the automotive system may include hardware and/or software components that are designed or developed by different entities. Further, the complex nature of the automotive system may lend to implementation that may not be secure from attack (e.g., by a hacker that wishes to intercept data and/or influence operation of the automotive system).

Due to these complexities, the probability of a recurring nonce is not insignificant. For example, the above described complexities can result in a software bug that causes a recurring nonce (e.g., such that the same nonce is always used), a counter overflow that results in a recurring nonce (e.g., when a counter is used as the nonce generator), a collision that results in a recurring nonce (e.g., when a random value from a rather small pool is used as the nonce), an attack that results in a recurring nonce (e.g., when an attacker injects a double nonce), and/or the like. In some cases, an attacker may exploit a recurring nonce, which may allow the attacker to recover plaintext data associated with the automotive system (thereby breaking data confidentiality) and/or may allow the attacker to recover a secret key and hence to forge messages (thereby breaking data authenticity and/or data integrity).

AES-GCM is a commonly used AEAD scheme that can be exploited due to a recurring nonce. The AES-GCM cipher uses Counter Mode (CTR) for symmetric encryption of a message, and uses Galois Message Authentication Code (GMAC) for the generation of a MAC. According to AES-GCM, an encrypted nonce/counter block is used as a keystream generator. Thus, if the same nonce N is used for two messages, the same keystream is generated. In such a case, if an attacker obtains two distinct ciphertexts (C and C') that were generated using the same nonce N and the same secret symmetric encryption key, then confidentiality is broken since the attacker is able to recover the underlying plaintext (P and P') due to the canceling property of the XOR operation. Additionally, if the attacker obtains two distinct tags (T and T') that were generated using the same nonce N and the same secret symmetric encryption key, then authenticity and integrity are broken since the attacker is able to recover the secret hashing key, which allows the attacker to forge a message using the secret hashing key (e.g., using Joux's Forbidden Attack).

A Synthetic Initialization Vector (SIV) construction may circumvent this issue by calculating a tag T with a Pseudo Random Function (PRF) using secret keys, $K_2$ and based on additional data A, plaintext P, and a nonce N. Here, the resulting tag T is used as the initialization vector (IV) for the symmetric encryption using another secret encryption key. Thus, additional data A, plaintext P, and nonce N build the input triple that result in distinct tags T. Since these are used for the keystream generation as SIVs, the keystream is different for each distinct message and, therefore, ciphertexts C are randomized. If the same additional data A, the same plaintext P and the same nonce N are used twice, the only information that the attacker can obtain is the fact that the same message was sent twice, but the attacker will be unable to recover the plaintext P or any secret key.

AES-GCM-SIV is an instance of the SIV paradigm that uses the building blocks of AES-GCM. For authenticated encryption according to an AES-GCM-SIV scheme, a PRF based on Galois Message Authentication (GMAC) is used for calculation of the tag, and the encryption of the plaintext is performed using CTR mode. In particular, the tag T is calculated as follows: additional data A and plaintext P are zero-padded to a multiple of the block size. Next, the additional data A, the plaintext P and a length-block L (that identifies the bit-lengths of the additional data A and the plaintext P) are fed into a MUL-XOR chain, where each node in the MUL-XOR chain is a Galois field multiplication times a secret hashing key. The result is XORed with the nonce N and then encrypted by a secret symmetric encryption key. The resulting tag T is used as the SIV for the CTR mode encryption. In this scheme, the most significant bit (MSB) must be cleared before the encryption of the tag T in order to prevent possible collisions (since the CTR mode encryption uses the same secret encryption key). Here, input blocks $I_1$ to $I_p$ for keystream generation in the CTR mode are generated by setting the MSB of tag T to 1 and incrementing the least significant bits of tag T for every plaintext block $P_1$ to $P_p$. Input blocks $I_1$ to $I_p$ are encrypted using the secret encryption key, and result of which are XORed with plaintext blocks $P_1$ to $P_p$, respectively, in order to form ciphertext blocks $C_1$ to $C_p$. For authenticated decryption, ciphertext blocks $C_1$ to $C_p$ are decrypted using the received tag as an IV for the CTR mode. During the decryption of the ciphertext blocks, the tag calculation can already begin. The calculated tag is calculated in the same manner as that associated with authenticated encryption. Next, the calculated tag is compared to the received tag. If the calculated tag matches the received tag, then the plaintext is output. Conversely, if the calculated tag does not match the received tag, then an invalidity symbol is output.

However, while AES-GCM-SIV is a nonce-misuse-resistant scheme (in that AES-GCM-SIV provides confidentiality, authenticity, and integrity of data, even in the case of a recurring nonce), there are drawbacks to this scheme. For example, the AES-GCM-SIV scheme requires different cryptographic primitives. Cryptographic primitives are well-established, low-level cryptographic algorithms that are frequently used to build cryptographic protocols for computer security systems. Examples of cryptographic primitives are a Galois Field multiplication and an AES block cipher, as non-limiting examples. Given the two different cryptographic primitives for the AES-GCM-SIV scheme, additional, more complex, and/or different hardware components may be needed in order to implement the AES-GCM-SIV scheme as compared to a scheme that requires building block(s) associated with one type of cryptographic primitive, only. Further, as a desired and/or required size of microcontrollers decreases, it may be desirable to implement a scheme that requires a single type of cryptographic primitive, such as an AES block cipher (e.g., such that fewer and/or less complex hardware components are needed).

Some implementations described herein provide a robust, flexible, automotive-targeted system for hardware-accelerated symmetric cryptography. The system includes a state machine that may be implemented in hardware, in software or as a combination of hardware and software implementing the state machine. The state machine is communicatively coupled to a plurality of matching block cipher devices (e.g., a plurality of cipher blocks associated with a single cryptographic primitive, such as a plurality of AES blocks). The term "matching block cipher devices," is used herein a synonym for "identical block cipher devices." The state machine is therefore coupled to a plurality of identical cryptographic primitives, since block ciphers are a subset of cryptographic primitives.

In some implementations, the system described herein can provide nonce-misuse-resistant AEAD based on Counter mode with CBC-based-MAC and Synthetic Initialization Vector (i.e., CCM-SIV) scheme, as described in further detail below. Additionally, or alternatively, the system can provide nonce-misuse-resistant authentication only.

In some implementations, since the state machine is coupled to a plurality of cipher blocks associated with the same cryptographic primitive, implementation of the CCM-SIV scheme may be simplified (e.g., as compared to an AEAD scheme that requires at least two different cipher blocks associated with two types of cryptographic primitives). For example, fewer, less complex, and/or smaller hardware components may be needed in order to provide nonce-misuse-resistant capabilities, which may reduce a design effort and/or a cost of the system (e.g., as compared to hardware components needed in order to implement the AES-GCM-SIV scheme).

In some implementations, the architecture of the system is such that the hardware state machine can independently invoke two or more of the plurality of matching block cipher devices to operate in a parallel mode (e.g., in order to increase performance), in a redundant mode (e.g., in order protect against errors and/or fault attacks), or some combination thereof, as described in further detail below.

Further, since the system requires cipher blocks associated with a single cryptographic primitive (e.g., only AES blocks), the system may be backwards compatible with existing hardware accelerators and/or software libraries, which may reduce implementation complexity of the system. Additionally, the cipher blocks may be used to realize other (existing) modes of operation (e.g., CTR, CBC, CFB, and/or the like, in the case of AES blocks), in some cases.

FIG. 1 is a diagram of an overview of an example system 100 described herein. As shown in FIG. 1, system 100 may include a state machine 102, a plurality of block cipher devices 104 (e.g., block cipher devices 1 through N (N>1)), and an input/output (I/O) 106.

State machine 102 directs and/or manages operation of block cipher devices 104. For example, as shown in FIG. 1, state machine 102 may be communicatively coupled to each of the plurality of block cipher devices 104. In some implementations, state machine 102 may invoke one or more block cipher devices 104 to perform a block-cipher-based symmetric cryptographic operation associated with securing a communication channel of an automotive system. A communication channel of an automotive system may include a channel between two or more communication parties, where at least one of the two or more communication parties is associated with an electrical device inside a vehicle, such as a Telematics Unit, a sensor, or another type of device. The communication channel may be used to transmit digital information between the two or more communication parties and can be wired and/or wireless. The two or more communication parties can be spatially separated (e.g., an Electronic Control Unit (ECU 210) communicating with a temperature sensor) or temporally separated (e.g. an ECU communicating with itself in the future by storing the digital information on a storage medium, such as flash memory).

For example, state machine 102 may receive (e.g., from a host processor via I/O 106) a command associated with a block-cipher-based symmetric cryptographic operation, and may cause one or more block cipher devices 104 to perform the block-cipher-based symmetric cryptographic operation. In a case where state machine 102 causes at least two block cipher devices 104 to perform the block-cipher-based symmetric cryptographic operation, state machine 102 can cause the at least two block cipher devices 104 to perform the block-cipher-based symmetric cryptographic operation in a parallel mode or a redundant mode.

Let us consider parallel mode first. For a plaintext P consisting of p blocks, it may be of interest—depending on circumstances—to speed up a block-cipher-based cryptographic operation on the plaintext P using two block cipher devices 104. In parallel mode, each of the block cipher devices 104, now operating in parallel, would get distinct portions of the plaintext P as input and would provide the corresponding portion of the result of the block-cipher-based cryptographic operation, such that a combination (e.g., concatenation) of all result portions yield the final result of the block-cipher-based cryptographic operation over the plaintext P. It will be appreciated that instead of using two block cipher devices 104 in parallel, more block cipher devices 104 may be used to increase throughput of block cipher devices 104 in parallel mode.

Redundant operation of two or more block cipher devices 104 calculating a block-cipher-based cryptographic operation over plaintext P is not so much interested in increasing performance, but in increasing reliability of the computed results. If it is of interest to increase reliability of the computed results, two or more block cipher devices 104 will get identical portions of the plaintext P as input. Should now the computed results for the identical portion differ over the two or more block cipher devices 104 in redundant mode, an alert may be generated, indicating that the computed results are no longer reliable, or are compromised due to an attack.

Depending on circumstances it may be of interest to selectively switch between the parallel mode of operation and the redundant mode of operation for two or more block cipher devices 104. This holds in particular for automotive communication channels where a large variety of traffic streams exists, where each stream has different requirements on performance (e.g., large amount of data is being sent) and reliability (e.g., safety-critical data is sent). To this end it is of interest to selectively switch a group of block cipher devices 104 from parallel mode to redundant mode and vice versa.

State machine 102 receives intermediate results, associated with the block-cipher-based symmetric cryptographic operation, from the one or more block cipher devices 104, and may provide (e.g., to the host processor via I/O 106) a final result associated with the block-cipher-based symmetric cryptographic operation.

As indicated above, block cipher device 104 includes a component to perform a block-cipher-based symmetric cryptographic operation associated with securing a communication channel of an automotive system. As indicated in FIG. 1, block cipher devices 104 are matching block cipher devices, meaning that each block cipher device 104 is associated with the same cryptographic primitive. For example, block cipher devices 104 may be a plurality of AES accelerators, each of which can be independently invoked by state machine 102 in order to perform a block-cipher-based symmetric cryptographic operation.

In some implementations, system 100 can provide a nonce-misuse-resistant AEAD scheme, as described in further detail below. Additionally, or alternatively, system 100 can provide nonce-misuse-resistant authentication-only. Further, the architecture of system 100 is such that state machine 102 can cause two or more block cipher devices 104 to operate in a parallel mode, a redundant mode, or some combination thereof, as described in further detail below. Additionally, since block cipher devices 104 are matching block cipher devices (i.e., associated with a single cryptographic primitive, such as AES), system 100 may be backwards compatible with existing hardware accelerators and/or software libraries, which may reduce implementation complexity and/or cost. Additionally, block cipher devices 104 may be used to realize other modes of operation, such as CTR, CBC, CFB, and/or the like (e.g., in a case where block cipher devices 104 are AES accelerators).

As indicated above, FIG. 1 is provided merely as an example. Other examples are possible and may differ from what was described with regard to FIG. 1.

Figure 2A:
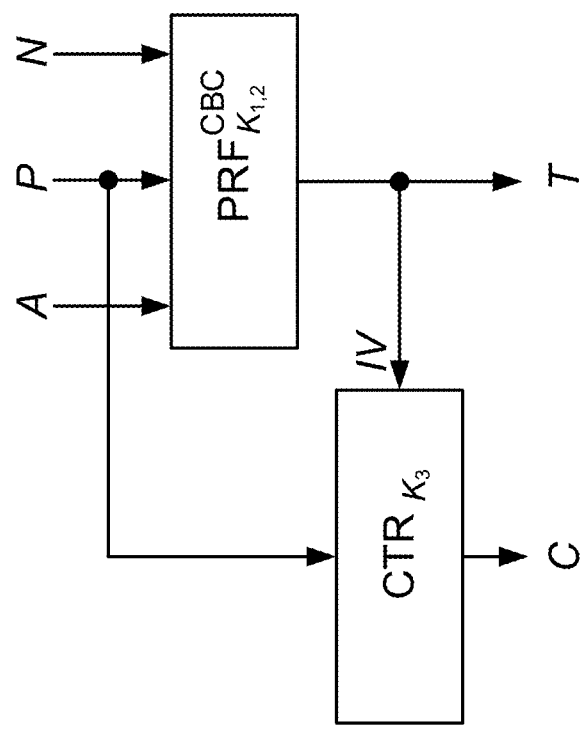
FIGS. 2A-2E are block diagrams associated with a nonce-misuse-resistant AEAD scheme that can be implemented using the system of FIG. 1.
Figure 2B:
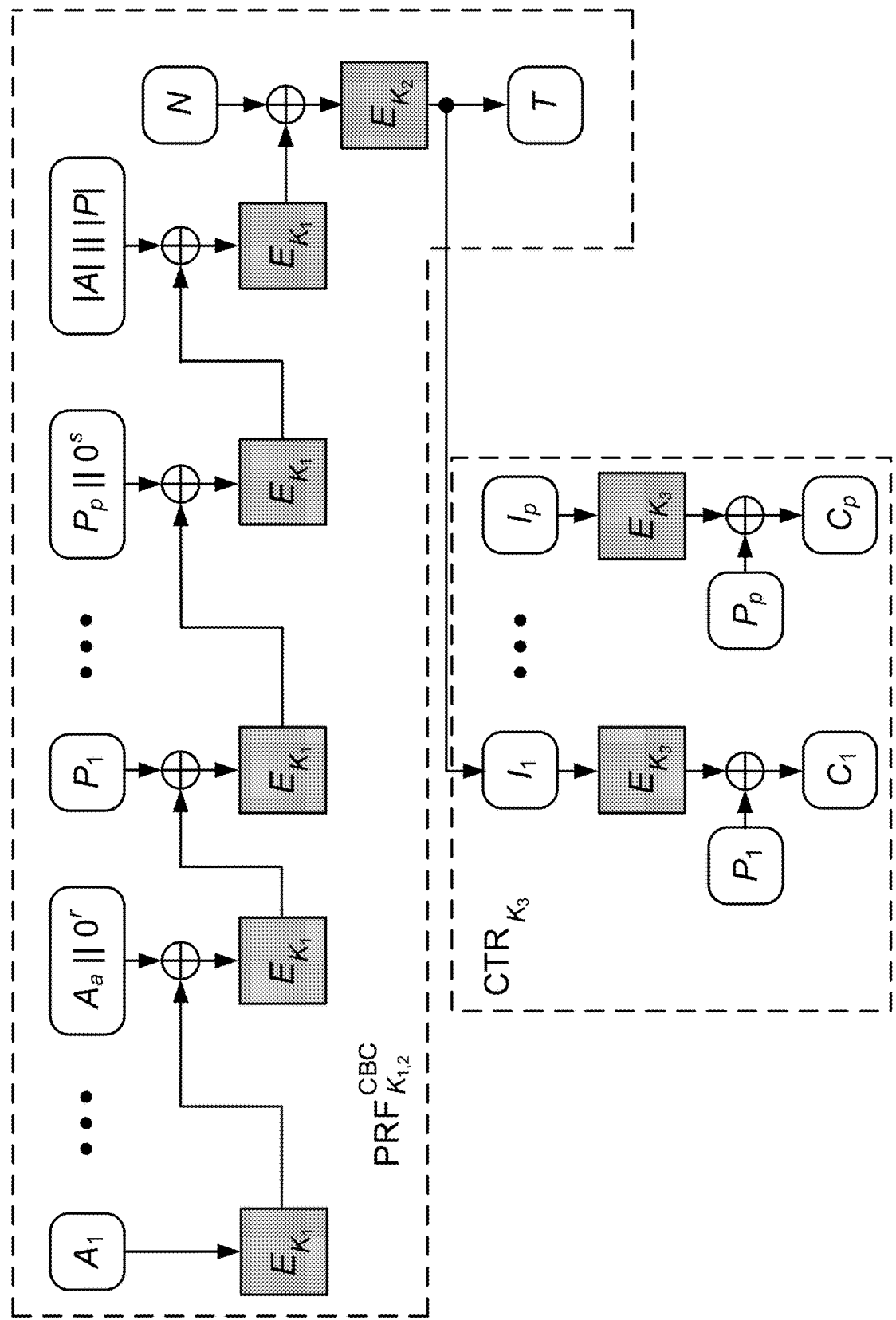
Figure 2C:
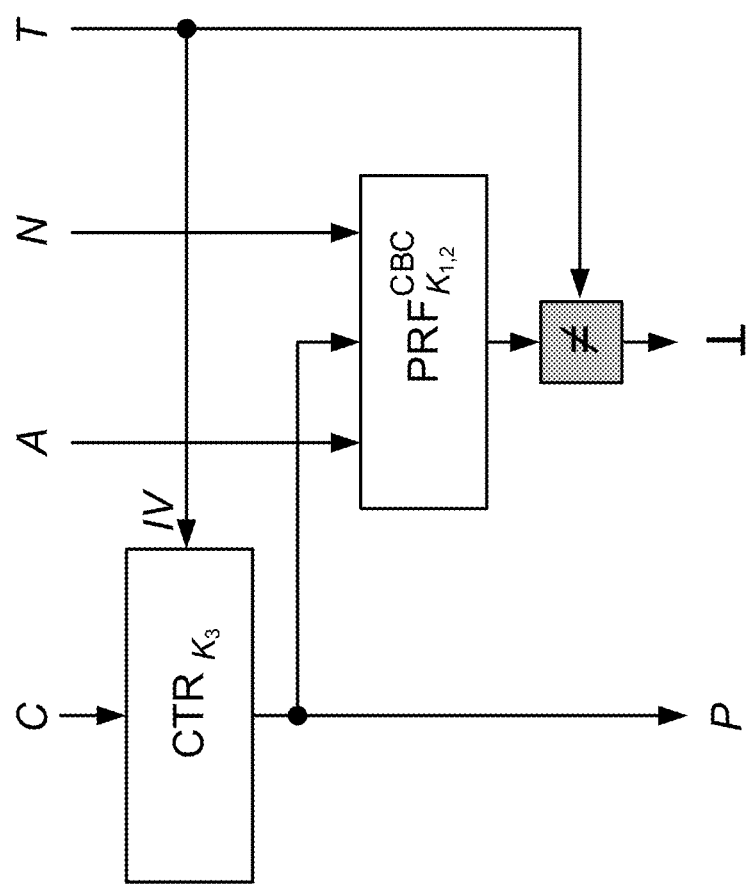
Figure 2D:
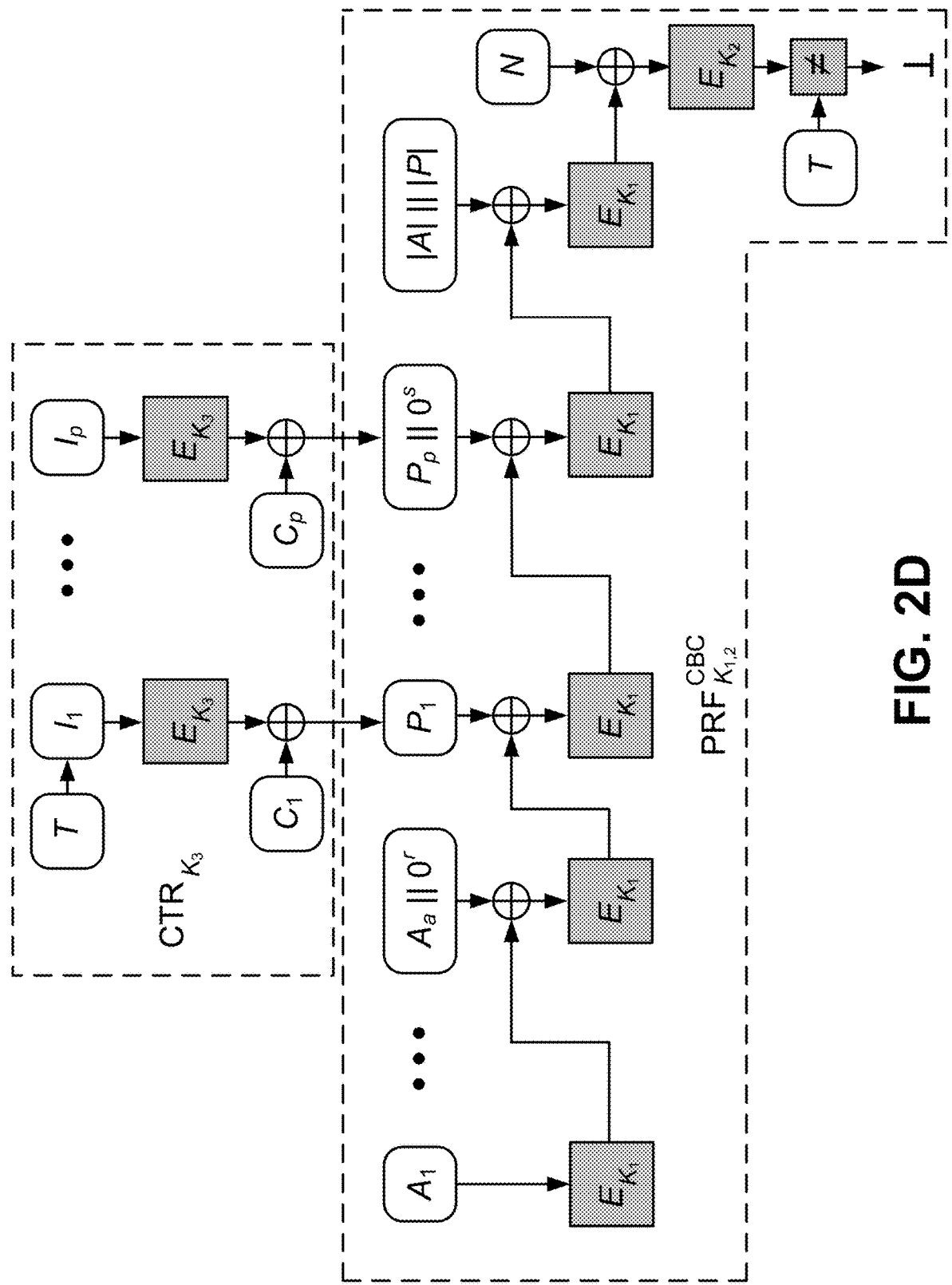
Figure 2E:
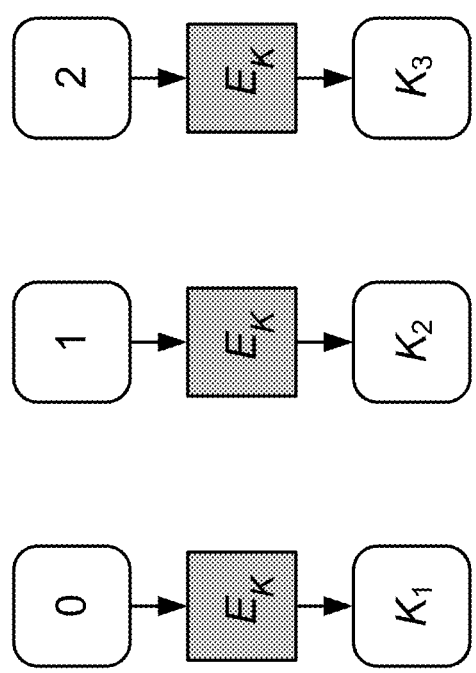

In some implementations, system 100 can provide a nonce-misuse-resistant AEAD scheme that is based on Counter mode with CBC-based-MAC and Synthetic Initialization Vector (CCM-SIV). FIGS. 2A-2E are block diagrams associated with a nonce-misuse-resistant AEAD scheme that can be implemented using the system of FIG. 1. FIGS. 2A and 2B are block diagrams illustrating an authenticated encryption operation associated with the CCM-SIV scheme, FIGS. 2C and 2D are block diagrams illustrating an authenticated decryption operation associated with the CCM-SIV scheme, and FIG. 2E is a block diagram illustrating a sub key derivation associated with the CCM-SIV scheme.

Similar to the AES-GCM-SIV scheme, the CCM-SIV scheme makes use of the SIV paradigm in order to provide nonce-misuse-resistance. In other words, the CCM-SIV scheme is a nonce-misuse-resistant scheme (in that the CCM-SIV provides confidentiality, authenticity, and integrity of data, even in the case of a recurring nonce). The CCM-SIV scheme includes a PRF based on CBC and a CTR mode implementation. In some implementations, the CCM-SIV scheme can be used for full AEAD, authentication-only (i.e., only a Message Authentication Tag appended to the plaintext), or confidentiality-only (i.e. only symmetric encryption of the plaintext).

With reference to FIG. 2A, the authenticated encryption operation of the CCM-SIV scheme takes additional data A, plaintext P, nonce N as input, and uses a set of secret keys $K_1$ through $K_3$. As shown, additional data A, plaintext P, and nonce N are input to the CBC-based PRF. Notably, the CBC-based PRF is AES-based (rather than based on Galois Field Multiplication in the AES-GCM-SIV scheme). Thus, the CBC-based PRF may be implemented using a block cipher device 104 in the form of an AES accelerator. As shown, the CBC-based PRF generates tag T based on additional data A, plaintext P, nonce N, and secret keys $K_1$ and $K_2$. Tag T is an output of the authenticated encryption operation, and is also used as an IV for the CTR mode.

As shown, the CTR mode uses plaintext P, tag T (as the IV), and secret key $K_3$, and generates ciphertext C. In some implementations, the CTR mode may be implemented using a block cipher device 104 in the form of an AES accelerator. A comparatively more detailed block diagram of the authenticated encryption operation of the CCM-SIV scheme is shown in FIG. 2B.

With reference to FIG. 2B, for additional data A (including additional data blocks $A_1$ through $A_a$) and plaintext P (including plaintext blocks $P_1$ through $P_p$) the CBC-based PRF calculates tag T as follows: a last additional data block $A_a$ is padded with r zeros such that a length of the additional data A is a multiple of a block size of the AES algorithm. Similarly, a last plaintext block $P_p$ is padded with s zeros such that a length of the plaintext P is a multiple of the block size of the AES algorithm. Furthermore, a length block containing the original bit-lengths of both additional data A and plaintext P is appended. The zero-padded additional data blocks $A_1$ through $A_a$, the zero-padded plaintext blocks $P_1$ through $P_p$ and the length block are then fed into a CBC-chain (e.g., where encryption of each block is performed under a first secret key $K_1$). An output of the CBC-chain is then XORed with nonce N, a result of which is encrypted using a second secret key $K_2$. A result of the encryption using secret key $K_2$ is tag T.

As further shown in FIG. 2B, tag T is used as a SIV for the symmetric encryption of the plaintext blocks $P_1$ through $P_p$ using the CTR mode under a third secret key $K_3$. Input blocks $I_1$ through $I_p$ for the keystream generation are generated by incrementing the least significant 32 bits of tag T (mod $2^{32}$ arithmetic):

| T[127:32] | T[31:0] |
| --- | --- |

As shown in FIG. 2B, an output of the CTR mode accelerator is ciphertext C (consisting of ciphertext blocks $C_1$ through $C_p$).

Turning now to FIG. 2C, the authenticated decryption operation of the CCM-SIV scheme takes ciphertext C, additional data A, nonce N (e.g., the same nonce use for the authenticated encryption operation), and a received tag T as input, and uses the same secret keys $K_1$ through $K_3$. As shown, the CTR mode accelerator uses ciphertext C, the received tag T (as the IV), and secret key $K_3$, and generates plaintext P. Next, additional data A, plaintext P (as generated by the CTR mode), and nonce N are input to the CBC-based PRF. The CBC-based PRF calculates a tag T' based on additional data A, plaintext P, nonce N, and secret keys $K_1$ and $K_2$. As shown, the received tag T is compared to the calculated tag T'. Here, if the received tag T matches the calculated tag T', then plaintext P is output. Conversely, if the received tag T does not match the calculated tag T', then an invalidity symbol is output. As described above, the CBC-based PRF and the CTR mode may be implemented using a block cipher device 104 in the form of an AES accelerator. A comparatively more detailed block diagram of the authenticated decryption operation of the CCM-SIV scheme is shown in FIG. 2D.

The authenticated decryption operation of the CCM-SIV scheme is similar to the authenticated encryption operation of the CCM-SIV scheme. For example, the CTR mode accelerator decryption of ciphertext C operates in a similar manner as the encryption of plaintext P, as described above in association with FIG. 2B. As shown in FIG. 2D, the received tag T is used as the IV, and input blocks $I_1$ through $I_p$ are encrypted under secret key $K_3$ to generate the keystream. The keystream is then XORed with ciphertext blocks $C_1$ through $C_p$ in order to obtain plaintext blocks $P_1$ through $P_p$.

Another tag T' for comparison with the received tag T is calculated in a manner similar to that described above (e.g., over the zero-padded additional data A, the zero-padded resulting plaintext P, a length block, and the nonce by using secret keys $K_1$ and $K_2$). The calculated tag is then compared with the received tag T. As described above, if the received tag T matches the calculated tag T', then plaintext P is output. Conversely, if the received tag T does not match the calculated tag T', then an invalidity symbol is output.

In some implementations, as indicated above, the CBC-based PRF and the CTR mode can be implemented using respective block cipher devices 104 in the form of AES accelerators to which state machine 102 is communicatively coupled. For example, the CBC-based PRF and the CTR mode can be implemented using a first block cipher device 104 communicatively coupled to state machine 102, while the CTR mode accelerator can be implemented using a second block cipher device. In such a case, state machine 102 may communicate with the first and second block cipher devices 104 in order to manage the CCM-SIV authenticated encryption/decryption operation. In some implementations, state machine 102 can provide a final result of the block-cipher-based symmetric cryptographic operation. For example, in the case of authenticated encryption using the CCM-SIV scheme, state machine 102 can provide ciphertext C, additional data A, nonce N, and/or tag T (e.g., for transmission on a communication channel of an automotive system). As another example, in the case of authenticated decryption using the CCM-SIV scheme, state machine 102 can provide plaintext P or an invalidity symbol (e.g., for use by a host processor). In some implementations, the CBC-based PRF and/or the CTR mode can each be implemented on multiple block cipher devices 104 operating in a parallel mode or a redundant mode, as described in further detail below.

Notably, the CCM-SIV scheme relies on a single cryptographic primitive (e.g., AES). As such, the CCM-SIV scheme can be implemented by system 100 including a plurality of matching block cipher devices 104 (e.g., as compared to the AES-GCM-SIV scheme, which requires block cipher devices associated with two different cryptographic primitives).

Further, the CCM-SIV scheme uses three secret keys $K_1$ through $K_3$ (as compared to the two secret keys used by the AES-GCM-SIV scheme). Here, the use of three secret keys means that some additional intermediate operations that are required by the AES-GCM-SIV scheme are not needed in the CCM-SIV scheme. For example, according to the AES-GCM-SIV scheme, a most significant bit (MSB) of tag T must be cleared before tag T is encrypted, in order to prevent possible collisions on the inputs of the block cipher invocations. However, the use of a third secret key $K_3$ in the CCM-SIV scheme eliminates a need for such additional intermediate operations and, therefore, may reduce complexity and/or increase performance.

In some implementations, the three secret keys $K_1$ through $K_3$ can be derived from a single master secret key K. FIG. 2E is a block diagram illustrating generation of the three secret keys $K_1$ through $K_3$. For example, as shown in FIG. 2E, secret keys $K_1$ through $K_3$ can be derived from master secret key K through three AES invocations by encrypting three constants (e.g., 0, 1, and 2). In some implementations, the generation of each secret key $K_1$ through $K_3$ can be performed (e.g., in parallel) by three block cipher devices 104 in the form of AES accelerators. In some implementations, secret keys $K_1$ through $K_3$ can be stored, and are fixed throughout the lifetime of master secret key K.

Figure 3A:
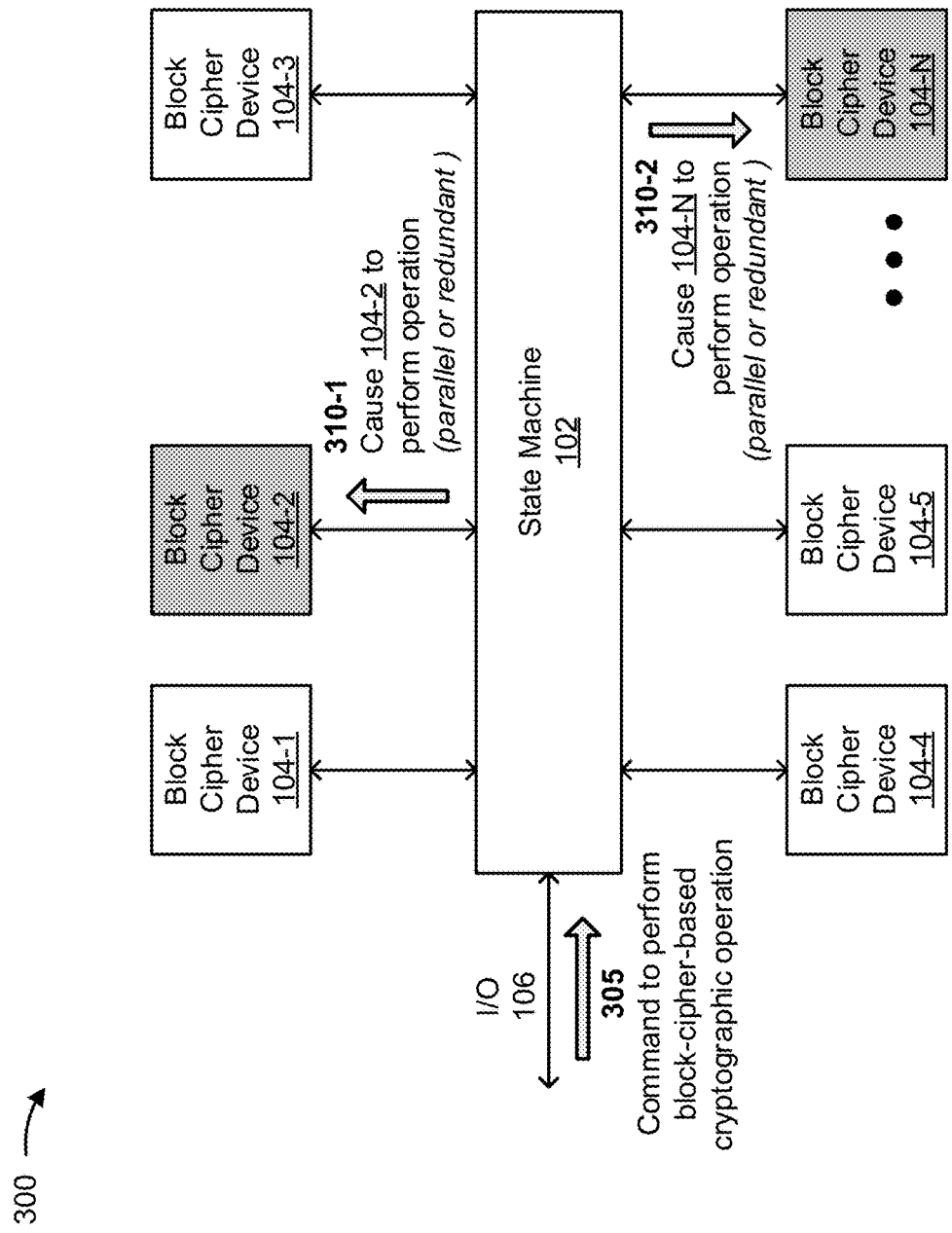
FIGS. 3A and 3B are example diagrams of a state machine causing two or more block cipher devices to operate in a parallel mode or a redundant mode in association with performing a block-cipher-based symmetric cryptographic operation.
Figure 3B:
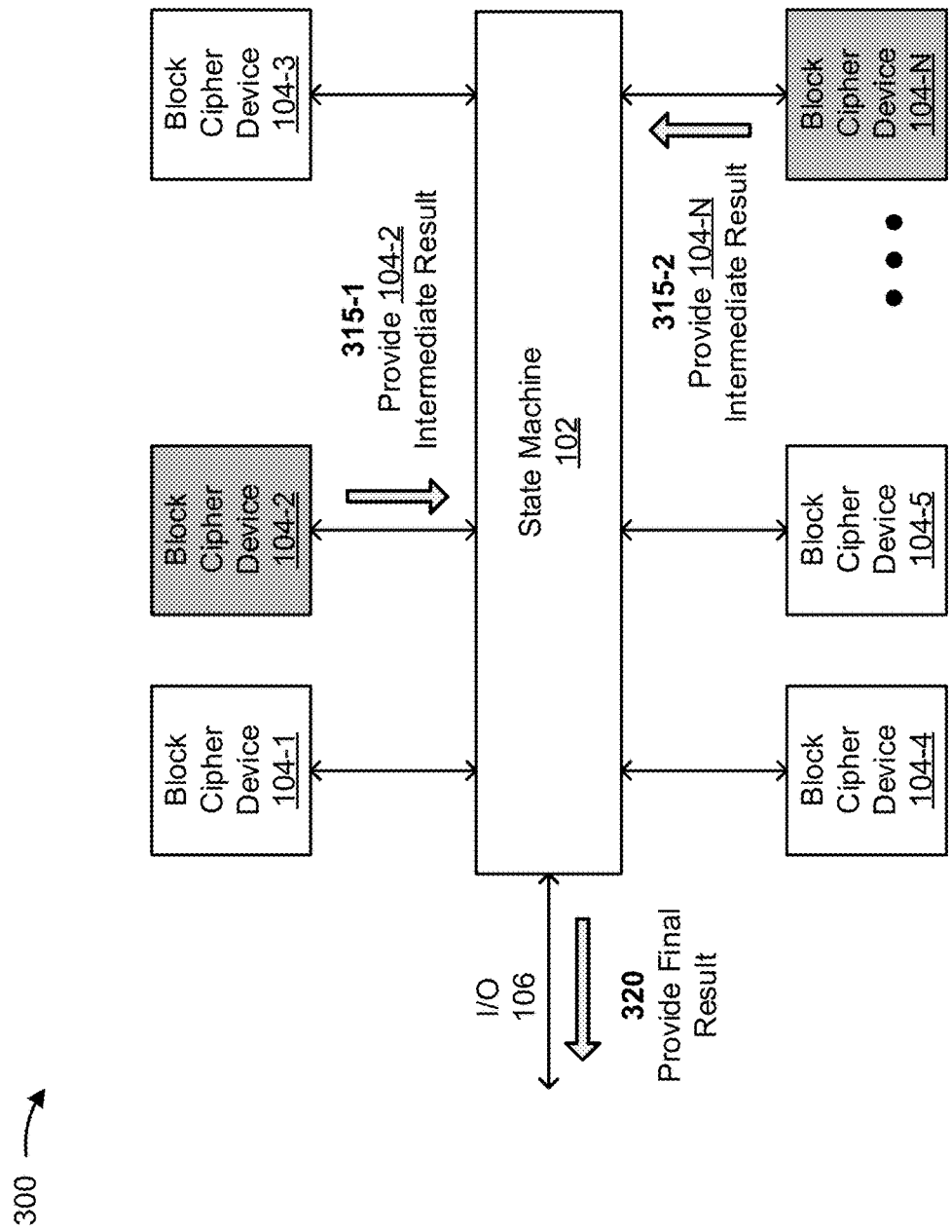

FIGS. 3A and 3B are diagrams of an example 300 of state machine 102 causing two or more block cipher devices 104 to operate in a parallel mode or a redundant mode.

As shown in FIG. 3A, and by reference number 305, state machine 102 may receive a command to perform a block-cipher-based symmetric cryptographic operation. For example, state machine 102 may receive (e.g., from a host processor) a command to perform an authenticated encryption operation (e.g., the authenticated encryption operation associated with the CCM-SIV scheme), an authenticated decryption operation (e.g., the authenticated encryption operation associated with the CCM-SIV scheme,) an authentication-only operation, a confidentiality-only operation, a key derivation operation, and/or another type of block-cipher-based symmetric cryptographic operation.

As shown by reference numbers 310-1 and 310-2, state machine 102 may cause at least two block cipher devices 104 (e.g., block cipher device 104-2 and block cipher device 104-N, as shown in FIG. 3A) to perform the block-cipher-based symmetric cryptographic operation in a parallel mode or a redundant mode.

In the redundant mode, each of the at least two block cipher devices 104 may perform the block-cipher-based symmetric cryptographic operation. For example, if the block-cipher-based symmetric cryptographic operation is an authenticated encryption operation, then state machine 102 may cause both block cipher device 104-2 and block cipher device 104-N to perform the authenticated encryption (e.g., such that both block cipher device 104-2 and block cipher device 104-N generate separate ciphertexts and tags based on the same additional data, plaintext, and secret keys). Here, results of the block-cipher-based symmetric cryptographic operation, provided by block cipher device 104-2 and block cipher device 104-N (sometimes referred to as intermediate results), can be compared by state machine 102 (e.g., in order to verify that matching results were provided) before output via I/O 106. In some implementations, operation of at least two block cipher devices 104 in redundant mode may protect against random errors and/or attacks (e.g., fault attacks). Thus, the redundant mode can therefore serve as an error detection mode and/or as an increased security mode.

In the parallel mode, each of the at least two block cipher devices 104 may perform separate portions of the block-cipher-based symmetric cryptographic operation. For example, if the block-cipher-based symmetric cryptographic operation is an authenticated encryption operation, then state machine 102 may cause block cipher device 104-2 and block cipher device 104-N to perform the authenticated encryption for portions of plaintext and/or additional data (e.g., such that block cipher device 104-2 and block cipher device 104-N generate separate outputs based on different portions of the additional data and plaintext, using the same secret keys). Block cipher devices 104 104-2 and 104-N provide intermediate outputs to state machine 102, and state machine 102 assembles everything the intermediate results and a final result via I/O 106. In some implementations, operation of at least two block cipher devices 104 in parallel mode may increase performance (e.g., by increasing a speed at which the block-cipher-based symmetric cryptographic operation is performed).

In some implementations, state machine 102 may cause block cipher devices 104 to perform the block-cipher-based symmetric cryptographic operation in a combined redundant/parallel mode. For example, state machine 102 may cause a first pair of block cipher devices 104 to perform a first portion of the block-cipher-based symmetric cryptographic operation in the redundant mode, and may cause a second pair of block cipher devices 104 to perform a second portion of the block-cipher-based symmetric cryptographic operation in the redundant mode (e.g., such that the first and second pairs operate in the parallel mode). Additionally, or alternatively, state machine 102 may cause different block cipher devices 104 to perform different block-cipher-based symmetric cryptographic operations at a given time (e.g., symmetric bulk encryption of first data by a first block cipher device 104, and authenticated encryption of second data by a second block cipher device 104).

As shown in FIG. 3B, and by reference numbers 315-1 and 315-2, after the at least two block cipher devices 104 perform the block-cipher-based symmetric cryptographic operation (e.g., in the parallel mode and/or the redundant mode), state machine 102 may receive intermediate results. As shown by reference number 320, state machine 102 may then provide a final result via I/O 106 (e.g., to a host processor). In some implementations, the final result may include multiple intermediate results (e.g., when the at least two block cipher devices 104 operate in the parallel mode) or a single intermediate result (e.g., when the at least two block cipher devices 104 operate in the redundant mode and state machine 102 determines that the intermediate results are matching).

In this way, state machine 102, communicatively coupled to each of a plurality of block cipher devices 104, can independently invoke two or more of the plurality of block cipher devices 104 to perform a block-cipher-based symmetric cryptographic operation, associated with securing a communication channel of an automotive system, in a redundant mode or a parallel mode.

As indicated above, FIGS. 3A and 3B are provided merely as examples. Other examples are possible and may differ from what was described with regard to FIGS. 3A and 3B.

FIG. 4 is a flow chart of an example process 400 of state machine 102 causing two or more block cipher devices 104 to operate in a parallel mode or a redundant mode in association with performing a block-cipher-based symmetric cryptographic operation. In some implementations, one or more process blocks of FIG. 4 may be performed by state machine 102.

As shown in FIG. 4, process 400 may include receiving a command associated with a cryptographic operation associated with securing a communication channel of an automotive system, wherein the cryptographic operation is a block-cipher-based symmetric cryptographic operation (block 410). For example, state machine 102 may receive a command associated with a cryptographic operation associated with securing a communication channel of an automotive system, wherein the cryptographic operation is a block-cipher-based symmetric cryptographic operation, as described above.

As further shown in FIG. 4, process 400 may include causing, based on the command, two or more block cipher devices, of a plurality of block cipher devices, to perform the cryptographic operation, wherein each of the two or more block cipher devices performs the cryptographic operation in a redundant mode or a parallel mode (block 420). For example, state machine 102 may cause, based on the command, two or more block cipher devices 104, of a plurality of block cipher devices 104, to perform the cryptographic operation, wherein the two or more block cipher devices 104 perform the cryptographic operation in a redundant mode or a parallel mode, as described above.

As further shown in FIG. 4, process 400 may include receiving, from the two or more block cipher devices 104, intermediate results associated with the cryptographic operation (block 430). For example, state machine 102 may receive, from the two or more block cipher devices 104, intermediate results associated with the cryptographic operation, as described above.

As further shown in FIG. 4, process 400 may include providing, based on the intermediate results, a final result associated with the cryptographic operation (block 440). For example, state machine 102 may provide, based on the intermediate results, a final result associated with the cryptographic operation, as described above.

In some implementations, the plurality of matching block cipher devices is a plurality of AES accelerators.

In some implementations, the block-cipher-based symmetric cryptographic operation is associated with an AEAD scheme that provides nonce-misuse-resistance.

In some implementations, the two or more block cipher devices 104 form a PRF and act as a CTR mode accelerator, wherein the PRF is based on CBC and uses a first secret key and a second secret key, and wherein the CTR mode accelerator uses a third secret key. In some implementations, a first block cipher device 104, of the two or more block cipher devices, forms the PRF, and a second block cipher device 104, of the two or more block cipher devices, acts as the CTR mode accelerator.

In some implementations, state machine 102 may cause at least one block cipher device 104 to derive one or more secret keys based on a master secret key.

In some implementations, the final result is provided to a host processor of an Electronic Control Unit (ECU) associated with an automotive system.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
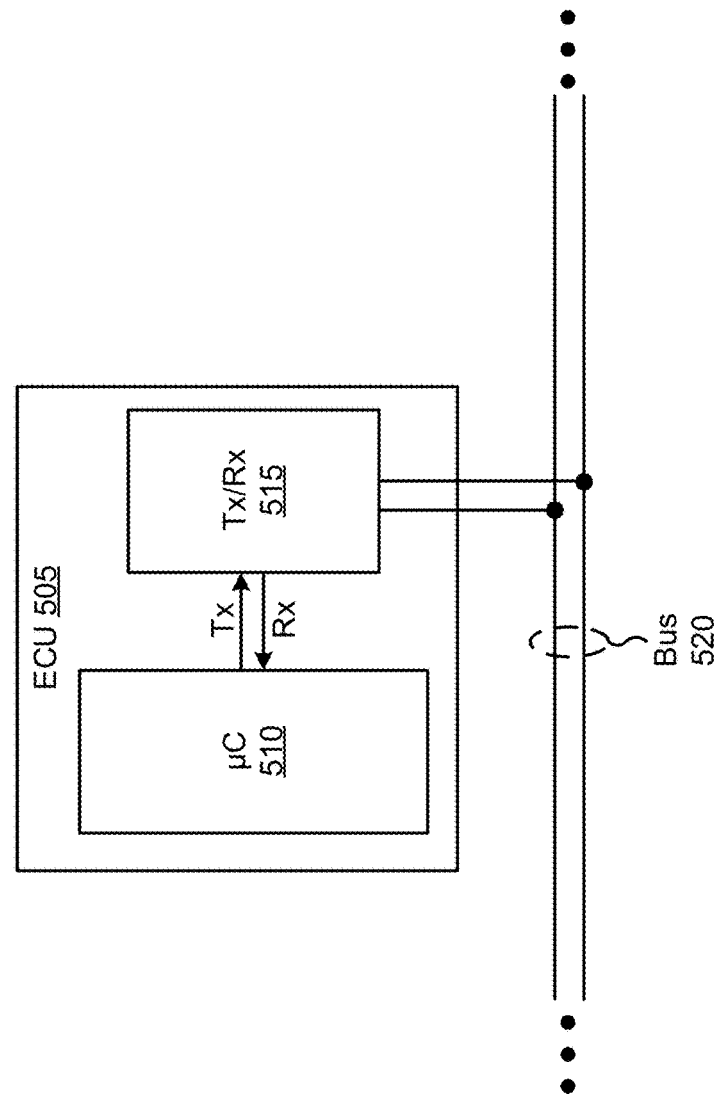
FIG. 5 is a diagram of an example environment in which systems and/or methods, described herein, may be implemented.

FIG. 5 is a diagram of an example environment 500 in which system 100 described herein may be implemented. As shown in FIG. 5, environment 500 may contain an Electronic Control Unit (ECU) 505 including a microcontroller (μC) 510 and a transceiver 515 connected to a bus 520.

ECU 505 includes one or more devices associated with controlling one or more electrical systems and/or electrical subsystems based, for example, on sensor data provided by sensors connected to ECU 505 via a sensor interface component of ECU 505 (not shown). For example, ECU 505 may include an Electronic/Engine Control Module (ECM), a Powertrain Control Module (PCM), a Transmission Control Module (TCM), a Brake Control Module (BCM or EBCM), a Central Control Module (CCM), a Central Timing Module (CTM), a General Electronic Module (GEM), a Body Control Module (BCM), a Suspension Control Module (SCM), or another type of electrical system or electrical subsystem of a vehicle.

Microcontroller 510 includes a device (e.g., one or more integrated circuits) that operates as an embedded system for providing the control functionality associated with ECU 505. For example, microcontroller 510 includes one or more CPUs, memories, and/or programmable I/O peripherals that allow microcontroller 510 to operate as an embedded system. In some implementations, microcontroller 510 may send information to and/or receive information from transceiver 515. In some implementations, state machine 102 and a plurality of block cipher devices 104, associated with securing a communication channel of an automotive system, may be configured on (e.g., at least partially implemented in hardware of) microcontroller 510. For example, state machine 102 and/or a plurality of block cipher devices 104 may be configured on one or more processor cores of microcontroller 510.

Transceiver 515 includes a component via which ECU 505 may transmit and receive information. For example, transceiver 515 may include a differential line transceiver, or a similar type device. In some implementations, transceiver 515 includes a transmit (Tx) component that allows ECU 505 to transmit information (e.g., to another ECU that is similar to ECU 505) via bus 520, and a receive (Rx) component that allows ECU 505 to receive information (e.g., from another ECU that is similar to ECU 505) via bus 520. In some implementations, transceiver 515 may include a line driver for enabling the Tx component (to transmit information) or the Rx component (to receive information) at a given time. In some implementations, transceiver 515 may be a Local Interconnected Network (LIN) transceiver, a Controller Area Network (CAN) transceiver, a FlexRay transceiver, an Ethernet transceiver, or another type of transceiver associated with another type of bus system. In some implementations, ECU 505 may include multiple transceivers 515 of different types.

Bus 520 includes a bus for carrying information from or to ECU 505. In some implementations, bus 520 may comprise a connection (e.g., including one or more wires and connectors) via which multiple ECUs 505 are connected to one another. In some implementations, bus 520 may include a set of connections, each associated with one or more ECUs 505. In some implementations, bus 520 may be a LIN bus, a CAN bus, a FlexRay bus, an Ethernet bus, or another type of bus. In some implementations, each transceiver 515 of ECU 505 may connected to an associated bus 520.

The number and arrangement of apparatuses shown in FIG. 5 is provided as an example. In practice, there may be additional devices and/or components, fewer devices and/or components, different devices and/or components, or differently arranged devices and/or components than those shown in FIG. 5. For example, in some implementations, environment 500 may include multiple ECUs 505, each connected via one or more associated busses 520. Furthermore, two or more devices and/or components shown in FIG. 5 may be implemented within a single devices and/or components, or a single devices and/or a single component shown in FIG. 5 may be implemented as multiple, distributed devices and/or components. Additionally, or alternatively, a set of devices and/or components (e.g., one or more devices and/or components) of FIG. 5 may perform one or more functions described as being performed by another set of devices and/or components of FIG. 5.

Further, in some implementations, system 100 herein may be implemented in another type of environment than that shown in FIG. 5. For example, system 100 can be implemented in an environment associated with encrypting and/or authenticating data stored in a storage medium, in some cases. In other words, system 100 is not restricted for use in association with encrypting and/or authenticating data associated with communication peripherals.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
    a plurality of matching block cipher devices; and
    a hardware state machine communicatively coupled to each of the plurality of matching block cipher devices,
    wherein each of the plurality of matching block cipher devices is configured to be independently invoked by the hardware state machine such that the hardware state machine causes two or more of the plurality of matching block cipher devices to selectively perform a block-cipher-based symmetric cryptographic operation in a redundant mode or a parallel mode,
        wherein the block-cipher-based symmetric cryptographic operation is associated with securing a communication channel of an automotive system,
        wherein first results, produced when the block-cipher-based symmetric cryptographic operation is in the redundant mode, are compared to verify that the first results match, and
        wherein second results, produced when the block-cipher-based symmetric cryptographic operation is in the parallel mode, are assembled to produce a third result.

2. The system of claim 1, wherein the plurality of matching block cipher devices is a plurality of Advanced Encryption Standard (AES) accelerators.

3. The system of claim 1, wherein the block-cipher-based symmetric cryptographic operation is associated with an authenticated encryption with additional data (AEAD) scheme that provides nonce-misuse-resistance,
    wherein the AEAD scheme requires a single type of cryptographic primitive.

4. The system of claim 3, wherein the two or more of the plurality of matching block cipher devices form a pseudo random function (PRF) and act as a counter (CTR) mode accelerator,
    wherein the PRF is based on cipher block chaining (CBC) and uses a first secret key and a second secret key, and
    wherein the CTR mode accelerator uses a third secret key.

5. The system of claim 1, wherein the redundant mode is a concurrent redundant mode or a time-offset redundant mode.

6. A method, comprising:
    receiving, by a hardware state machine, a command associated with a block-cipher-based symmetric cryptographic operation,
        wherein the block-cipher-based symmetric cryptographic operation is associated with securing a communication channel of an automotive system;

causing, by the hardware state machine and based on the command, two or more block cipher devices to perform the block-cipher-based symmetric cryptographic operation in a redundant mode or a parallel mode,
   wherein the two or more block cipher devices are included in a plurality of matching block cipher devices communicatively coupled to the hardware state machine,
   wherein the two or more block cipher devices form a pseudo random function (PRF) and act as a counter (CTR) mode,
   wherein the pseudo random function (PRF) is based on cipher block chaining (CBC) and uses a first secret key and a second secret key, and
   wherein the counter (CTR) mode uses a third secret key;
receiving, by the hardware state machine and from the two or more block cipher devices, intermediate results associated with the block-cipher-based symmetric cryptographic operation;
selectively:
   verifying, by the hardware state machine, that the intermediate results match based on the block-cipher-based symmetric cryptographic operation being in the redundant mode, or
   assembling, by the hardware state machine, the intermediate results to produce a final result based on the block-cipher-based symmetric cryptographic operation being in the parallel mode; and
providing, by the hardware state machine:
   the intermediate results based on the block-cipher-based symmetric cryptographic operation being in the redundant mode and based on verifying that the intermediate results match, or
   the final result based on the block-cipher-based symmetric cryptographic operation being in the parallel mode.

7. The method of claim 6, wherein the plurality of matching block cipher devices is a plurality of Advanced Encryption Standard (AES) accelerators.

8. The method of claim 6,
   wherein a first block cipher device, of the two or more block cipher devices, forms the PRF, and
   wherein a second block cipher device, of the two or more block cipher devices, acts as a CTR mode accelerator.

9. The method of claim 6, wherein the block-cipher-based symmetric cryptographic operation is associated with an authenticated encryption with additional data (AEAD) scheme that provides nonce-misuse-resistance,
   wherein the AEAD scheme requires a single type of cryptographic primitive.

10. The method of claim 6, further comprising:
    causing at least one of the plurality of matching block cipher devices to derive the first secret key, the second secret key, or the third secret key based on a master secret key.

11. The method of claim 6, wherein the final result is provided to a host processor of an electronic control unit (ECU) associated with the automotive system.

12. A system, comprising:
    a plurality of block cipher devices,
       wherein each of the plurality of block cipher devices is associated with a same cryptographic primitive; and
    a state machine, at least partially implemented in hardware and communicatively coupled to each of the plurality of block cipher devices, to:
       receive a command associated with a cryptographic operation associated with securing a communication channel of an automotive system,
          wherein the cryptographic operation is a block-cipher-based symmetric cryptographic operation,
       cause, based on the command, two or more block cipher devices, of the plurality of block cipher devices, to perform the cryptographic operation,
          wherein each of the two or more block cipher devices performs the cryptographic operation in a redundant mode or a parallel mode,
       receive, from the two or more block cipher devices, intermediate results associated with the cryptographic operation,
       selectively:
          verify that the intermediate results match based on the cryptographic operation being in the redundant mode, or
          assemble the intermediate results to produce a final result based on the cryptographic operation being in the parallel mode, and
       provide:
          the intermediate results based on the cryptographic operation being in the redundant mode and based on verifying that the intermediate results match, or
          the final result based on the cryptographic operation being in the parallel mode.

13. The system of claim 12, wherein the plurality of block cipher devices is a plurality of Advanced Encryption Standard (AES) accelerators.

14. The system of claim 12, wherein the block-cipher-based symmetric cryptographic operation is associated with an authenticated encryption with additional data (AEAD) scheme that provides nonce-misuse-resistance.

15. The system of claim 12, wherein the two or more block cipher devices form a pseudo random function (PRF) and act as a counter (CTR) mode accelerator,
   wherein the PRF is based on cipher block chaining (CBC) and uses a first secret key and a second secret key, and
   wherein the CTR mode accelerator uses a third secret key.

16. The system of claim 15, wherein a first block cipher device, of the two or more block cipher devices, forms the PRF, and a second block cipher device, of the two or more block cipher devices, acts as the CTR mode accelerator.

17. The system of claim 12, wherein the state machine is further to:
    cause at least one of the plurality of block cipher devices to generate one or more secret keys based on a master secret key.

18. The system of claim 12, wherein the final result is provided to a host processor of an Electronic Control Unit (ECU) associated with the automotive system.

19. The method of claim 6, further comprising:
    causing a first set of the two or more block cipher devices to perform a first portion of the block-cipher-based symmetric cryptographic operation in the redundant mode; and
    causing a second set of the two or more block cipher devices to perform a second portion of the block-cipher-based symmetric cryptographic operation in the redundant mode,
       wherein the first portion of the block-cipher-based symmetric cryptographic operation is performed in parallel with the second portion of the block-cipher-based symmetric cryptographic operation.

20. The method of claim 6, further comprising:
  causing the two or more block cipher devices to switch between the redundant mode and the parallel mode.

\* \* \* \* \*